Jan. 24, 1956 R. C. PALMER 2,732,469

PHOTOSENSITIVE DEVICE

Filed Oct. 8, 1952

INVENTOR.
RICHARD C. PALMER
BY Darby & Darby
ATTORNEYS

United States Patent Office 2,732,469

Patented Jan. 24, 1956

2,732,469

PHOTOSENSITIVE DEVICE

Richard C. Palmer, Pompton Plains, N. J., assignor to Allen B. Du Mont Laboratories, Inc., Clifton, N. J., a corporation of Delaware Application October 8, 1952, Serial No. 313,642

9 Claims. (Cl. 201—63)

This invention relates to photosensitive or photoresponsive devices of the type used in television systems to transform light from a visible image into an electrical signal. In particular it relates to photoconductive and photovoltaic image transducers.

In the television art, visible images or scenes are translated by image transducers into representative electrical signals for broadcasting to the receiver. In one form of prior image transducer, a scanning spot of light on the screen of a cathode ray tube is focused on the same photosensitive surface as light from the image or scene being transmitted. For a surface of a photoconductive material, light from the image sets a level of conductivity for each of the elemental areas of the surface, and the conductivity of the entire surface is the sum of all the elemental conductivities. Light from the cathode ray tube commutates the elemental areas by increasing the conductivity of each area in turn to its maximum, and the variation in the overall conductivity is transformed into an electrical signal.

The present invention is directed toward improvements in systems of the general type of that just described, whereby there is avoided the inconvenience and distortion present in such prior systems because of the necessity of projecting two sources of light (i. e., the cathode ray tube and the transmitted scene) upon the same photoresponsive surface.

In the present invention light from the transmitted scene is focused on one surface and light from the tube on another, conductively connected surface, preferably the reverse side of the first surface. By this means, the overall conductivity of the entire surface may be limited almost to the conductivity of the elemental area being commutated, and the sensitivity of the cell may be greatly increased thereby.

One of the objects of this invention is to provide an improved television pick-up device.

Other objects are to provide an improved photosensitive device using photoconductive and/or photovoltaic materials, and to provide an improved pick-up device in which a cathode ray picture tube may be utilized as a scanning element. Still further objects will become apparent after the following specification and drawings in which.

Figures 1, 2:
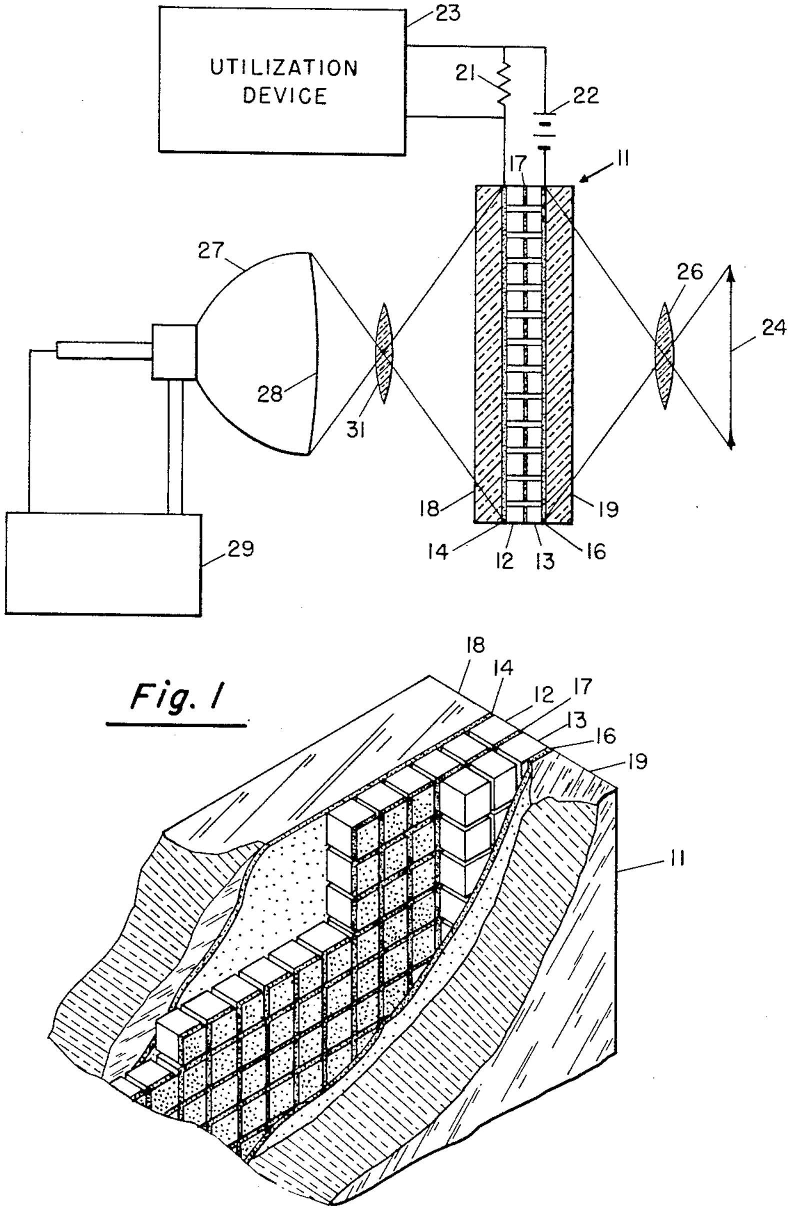
Fig. 1 shows a pick-up device according to the invention.
Fig. 2 is an enlarged section of the photoresponsive cell of Fig. 1.

The photosensitive cell forming this invention comprises in surface-to-surface contact, a transparent conductive film, a first or switching layer or surface of photosensitive material, a conductive barrier layer on the photosensitive material, a second or signal layer or surface of photosensitive material on the barrier layer, and a second transparent conductive film in contact with the second layer. Both of these photosensitive surfaces together with the barrier layer may be divided into corresponding elemental areas which together form sets of sandwich-like elements, each consisting of a bit of barrier material separating two particles of photosensitive material, one particle from the signal surface and one from the switch surface.

In order to simplify the description of the operation of the device, a cell in which both the switch and signal surfaces consist of photoconductive material will be used as an example. The extension of the ideas set forth to the case of a cell having at least one surface made of photovoltaic material will be merely routine for those skilled in the art.

Referring to the drawing, the image transducer in Fig. 1 comprises a photosensitive cell 11 consisting of two layers 12 and 13 of photosensitive material in contact with transparent conductive films 14 and 16 respectively and separated by an opaque, conductive barrier layer 17. In order to be transparent, conductive films 14 and 16 are usually not self-supporting and hence must be supplied with glass backing elements 18 and 19, respectively. "Nesa glass" is one such combination of conductive film and glass support.

The films 14 and 16 are connected to the terminals of a series circuit comprising a load resistor or impedance 21 and a voltage source, or battery, 22; and a utilization device 23 is coupled to the series circuit, in this case by being connected directly across the load resistor 21.

The construction of the cell 11 is shown in greater detail in Fig. 2. The various layers and films making up the cell are broken away, layer by layer, to illustrate better the internal construction. As shown in Fig. 2, layers 12 and 13 and the barrier layer 17 are divided into minute elements or particles, each elemental area of layer 12 being made to correspond exactly to an elemental area of layer 13 and of the barrier layer 17. In this way, the conductive barrier layer 17 is prevented from connecting together all the elemental areas of layer 12 which are already interconnected on the other side by layer 14.

In this manner, the two photosensitive layers and their intervening barrier layer 17 form a series of "sandwiches," tied together on their outer surfaces by the conductive layers 14 and 16.

Facing one of the photosensitive layers, such as 13, is an optical system of any suitable type which projects on the signal layer 13 an optical image of the transmitted scene 24. Facing the other photosensitive layer 12 is another optical system 31 of suitable type which projects on layer 12 an image of the screen 28 of a cathode ray tube 27. Tube 27 is energized in conventional manner from a source 29 so that its cathode ray beam repetitively scans the surface of screen 28, to form a "flying spot." This spot is projected onto layer 12 and sequentialy excites the elemental areas thereof.

Light from the transmitted image focused on the signal surface 13 causes the elemental areas thereof to assume respective conductivities corresponding to the intensities of the light impinging thereon. Light from the screen 28 of the scanner cathode ray picture tube 27 is focused on the switch surface 12, and as the electron beam scans the face of the tube 27, the image of the moving spot of light scans the elements of the switch surface 12, increasing the conductivity of each in turn from its minimum to a maximum, thereby successively short-circuiting the left portion of the elemental "sandwiches" and effectively directly connecting conductive layer 14 to the elemental area of the barrier layer 17 and connecting each corresponding element of the signal surface 13, in order, to the conductive film 14 with which the switch surface 12 is in contact.

Each of the elemental area making up surfaces 12 and 13 has associated with it a capacitance as well as a resistance. The capacitance is determined by the structure and material of each of the elemental areas, and unlike the resistance, does not vary with the intensity of the light. The sharp reduction in the resistance of an element of surface 12 under excitation by the image of the scanning spot on faceplate 28 charges the capacitance of the juxtaposed element of surface 13 to substantially the same level on each scan, but between scans this charge leaks off at a rate determined by the time constant of the particular element of surface 13. This time constant, in turn, is determined by the capacitance and by the variable resistance of the element of surface 13 as that resistance is affected by the image of object 24. Preferably, the time constant is of a length sufficient to enable the discharge to operate only on the linear portion of the normal exponential decay curve, although a variance therefrom may be corrected, if desired, by other circuits, as is well known in the art. The electrical signal generated by the charge of each elemental area of surface 13, as the charge current flows through the series circuit 21 and 22, is therefore a function of the instantaneous charge rather than the long time decay and is the desired television signal. By this means, utilization is made of the storage principle common to other successful television pickup tubes.

In summary, the transmitted image is projected upon signal surface 13, and creates a pattern of conductivity of the several surface elements, each element having an individual conductivity corresponding to the light intensity falling upon it. If all the switch elements are nonconductive (as when the flying spot is absent), no current can flow in the circuit from battery 22 through load resistor 21 and the cell. However, if a single switch element is made conductive, as by the flying light spot, then current flows through it and its juxtaposed signal element. No current, however, flows through any other elemental area, so that the current flow is indicative of the illuminations solely of one signal element. The flying light spot scans the entire switch surface, and renders its elemental areas sequentially conductive, so that the output signal represents sequential samplings of the illumination of the various signal elements, as is desired. It will thus be seen that surface 12 and the flying spot essentially constitute a commutator switch to connect the signal elements sequentially in the battery and load circuit. Of course, the conductivity of each switch element when illuminated should be high compared with that of each signal element. This can be assured either by choice of material, or by use of high light intensity for the flying spot.

It is desirable that the ratio of maximum conductivity of each elemental area of the switch surface 12 under full illumination to minimum conductivity under no illumination be high in order that the conductivity of the switch surface 12 be determined as much as possible by the conductivity of that element of switch surface 12 being illuminated by the scanning spot of light. A high ratio material is also desirable in the signal surface 13 since it leads to a higher output signal voltage for the same battery voltage and load resistor values, than would be obtained with a low ratio material.

It will be understood that special effects, such as shading, fade-outs, masking, etc. may be readily accomplished by modulating the intensity of the electron beam of tube 27 to correspondingly vary the intensity of the flying spot, which will in turn modify the output signal. The various ways of modulating the beam to provide desired effects will be obvious to skilled technicians in this art.

While the above embodiment of the invention has been described with respect to photoconductive surfaces, it will be apparent that the signal and switch surfaces could be of any type of photoresponsive material. For example, one could be photovoltaic, in which case, as is well known, each element would generate its own voltage corresponding to its illumination intensity. In such case, battery 22 could be omitted. The photoresponsive surface 12 would act as a switch or commutator in the same manner described above.

In some situations, the opacity of layers 12 and 13 may be sufficient to prevent light from the tube 27 from affecting layer 13, or light from the transmitted image from affecting layer 12. In such case, the opaque barrier layer 17 may be omitted. Furthermore, since surface conduction is relatively slight, in such case the layers 12 and 13 need not be divided into elemental particles, but may be continuous.

Also, although a cathode ray tube type of flying spot scanner has been described, it will be understood that any type of scanner may be used, including a mechanical scanner, a Nipkow disc scanner, etc.

A further modification, not shown, which is especially suited to such a device as cell 11 is to provide means, such as individual filters, for limiting the response of different ones of the elemental areas of layer 13 respectively to the three primary colors of a color television system. For this purpose, it might be preferable to divide layers 12 and 13 and the barrier layer 17 into elements of hexagonal or other shape. This is merely a matter of choice since the invention is not limited to a preferred type of particle shape.

Still further modifications may be made within the scope of the invention as defined by the following claims.

I claim:

1. A photosensitive device comprising a pair of photosensitive layers, said layers having oppositely facing surfaces adapted to be illuminated by respective light sources, and also having juxtaposed faces which are conductively connected over their entire surfaces.

2. A photosensitive device comprising first and second photosensitive layers, each layer being divided into relatively insulated elemental areas, with each area of one layer conductively juxtaposed to a respectively corresponding area of the other layer.

3. A photosensitive device comprising a pair of conductive films; a first layer of photosensitive material on the surface of a first one of said films facing the other of said films; a second layer of photosensitive material on the surface of said other film facing said first film, the proximal faces of said layers being conductively connected.

4. A photosensitive device comprising a pair of conductive films; a first layer of photosensitive material on the surface of a first one of said films facing the other of said films; a second layer of photosensitive material on the surface of said other film facing said first film; and an opaque conductive connection between the proximal faces of said layers.

5. A photosensitive device comprising a pair of light-transmitting conductive films; a first layer of photosensitive material on the surface of a first one of said films facing the other of said films, a second layer of photosensitive material on the surface of said other film facing said first film, the proximal surfaces of said layers being in conductive contact with each other, said layers being opaque to light transmtited through said films.

6. A photosensitive device comprising a pair of conductive films; a first layer of photosensitive material on the surface of a first one of said films facing the other of said films; a second layer of photosensitive material on the surface of said other film facing said first film; and a layer of opaque conductive material separating and contiguous with both photosensitive layers.

7. A photosensitive device comprising a pair of conductive transparent films; a first layer of photosensitive material on the surface of a first one of said films facing the other of said films; a second layer of photosensitive material on the surface of said other film facing said first film, each of said layers being divided into elemental areas; and an opaque conductive connection between said layers.

8. A photosensitive device comprising a pair of conductive transparent films, a first layer of photosensitive material on the surface of a first one of said films facing the other of said films, a second layer of photosensitive material on the surface of said other film facing said first film, each of said layers being divided into elemental areas with each area of one layer conductively juxtaposed to a respectively corresponding area of the other layer.

9. A photosensitive device comprising a pair of conductive transparent films; a first layer of photosensitive material on the surface of a first one of said films facing the other of said films; a second layer of photosensitive material on the surface of said other film facing said first film; and a barrier layer of opaque conductive material separating and contiguous with both photosensitive layers, both of said photosensitive layers and the barrier layer therebetween being divided into sandwich-like elemental sections.

References Cited in the file of this patent

UNITED STATES PATENTS

| | | |
|---|---|---|
| 2,150,160 | Gray | Mar. 14, 1939 |
| 2,150,168 | Ives | Mar. 14, 1939 |
| 2,320,977 | Nicolson | June 1, 1943 |
| 2,431,510 | Salinger | Nov. 25, 1949 |

FOREIGN PATENTS

| | | |
|---|---|---|
| 909,054 | France | Apr. 29, 1946 |